UNITED STATES PATENT OFFICE.

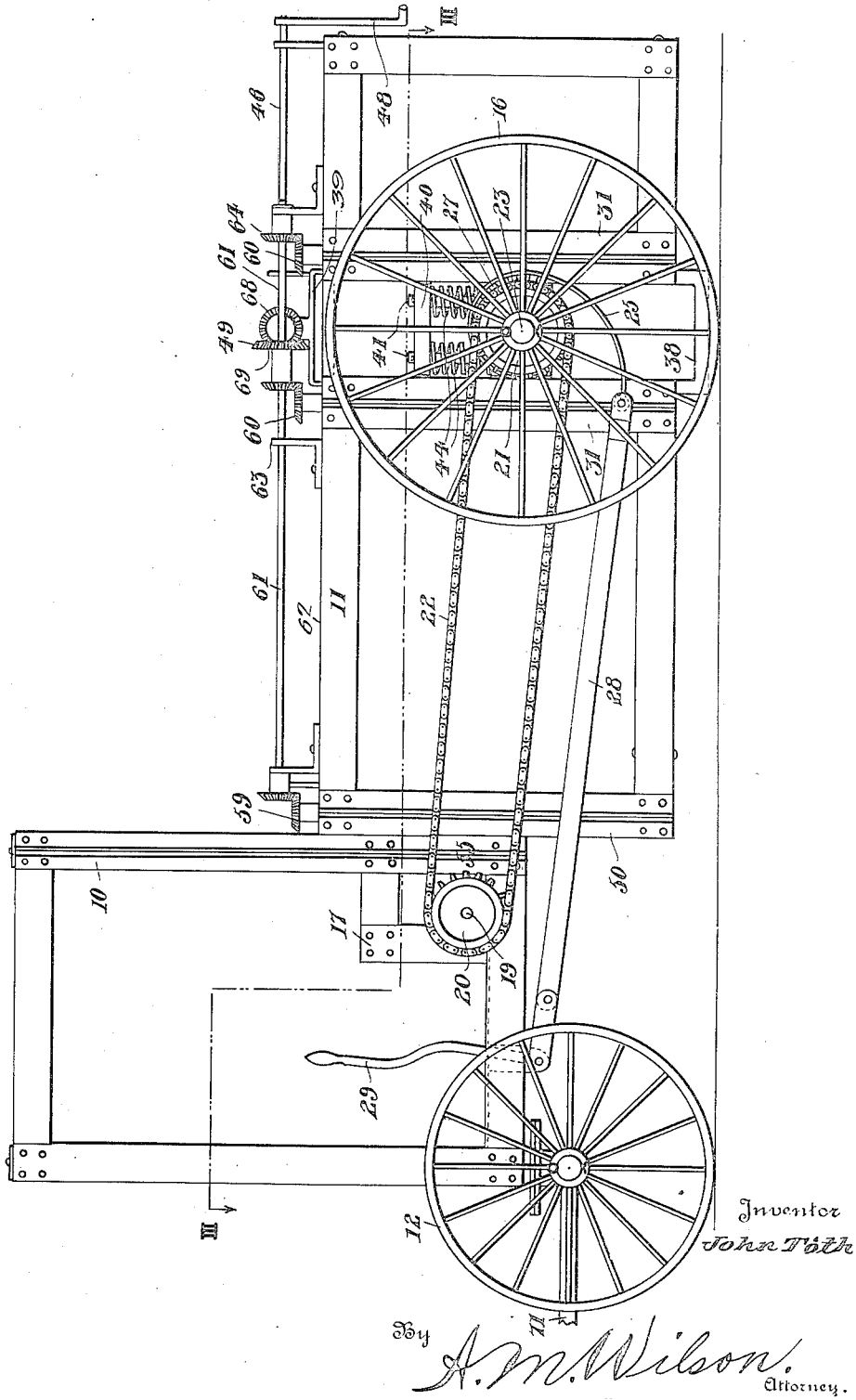

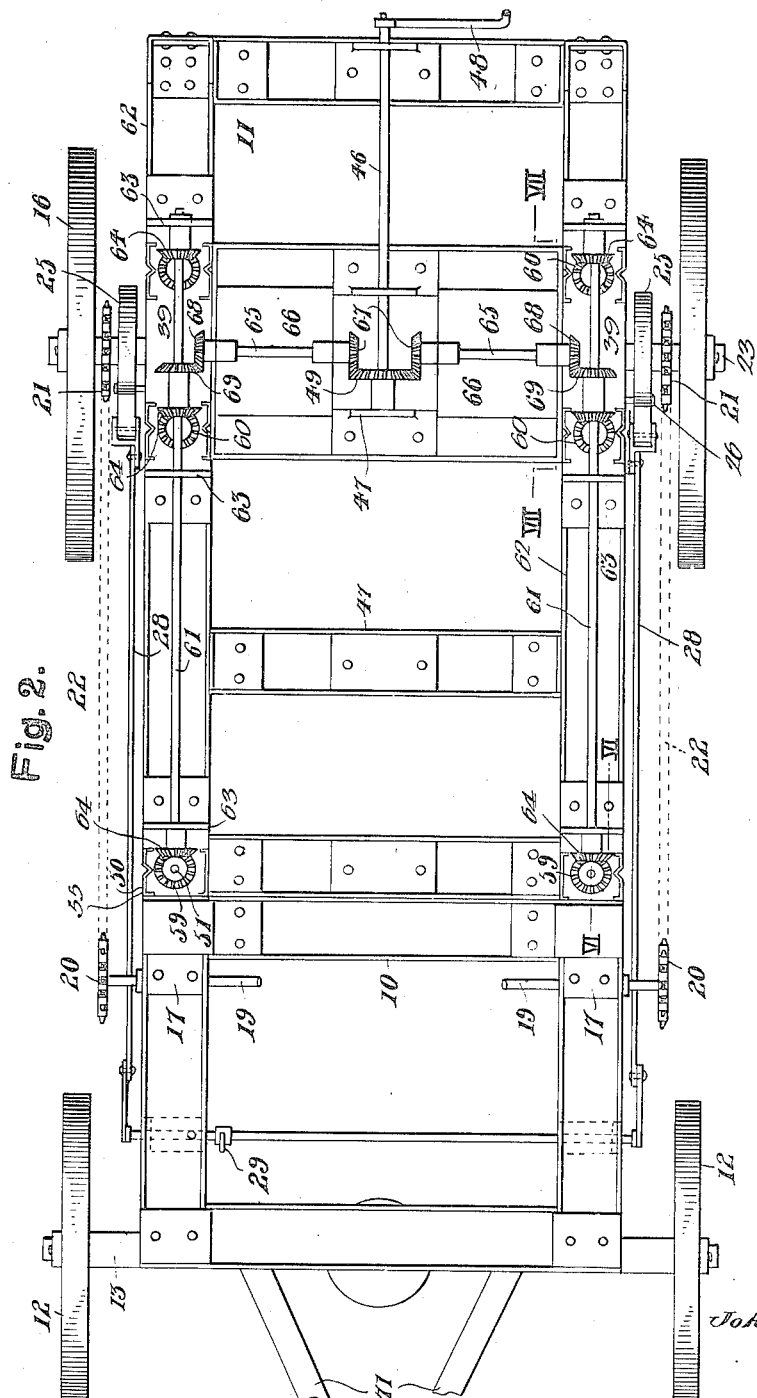

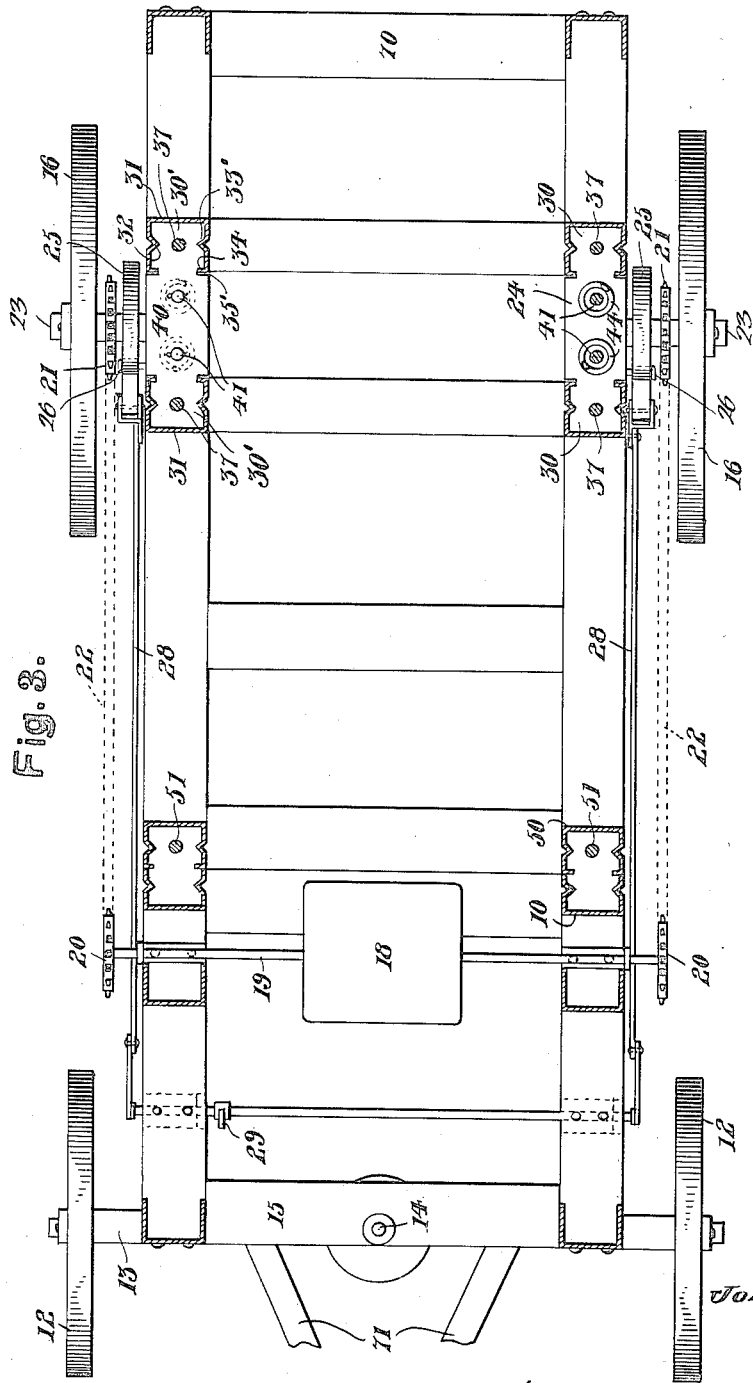

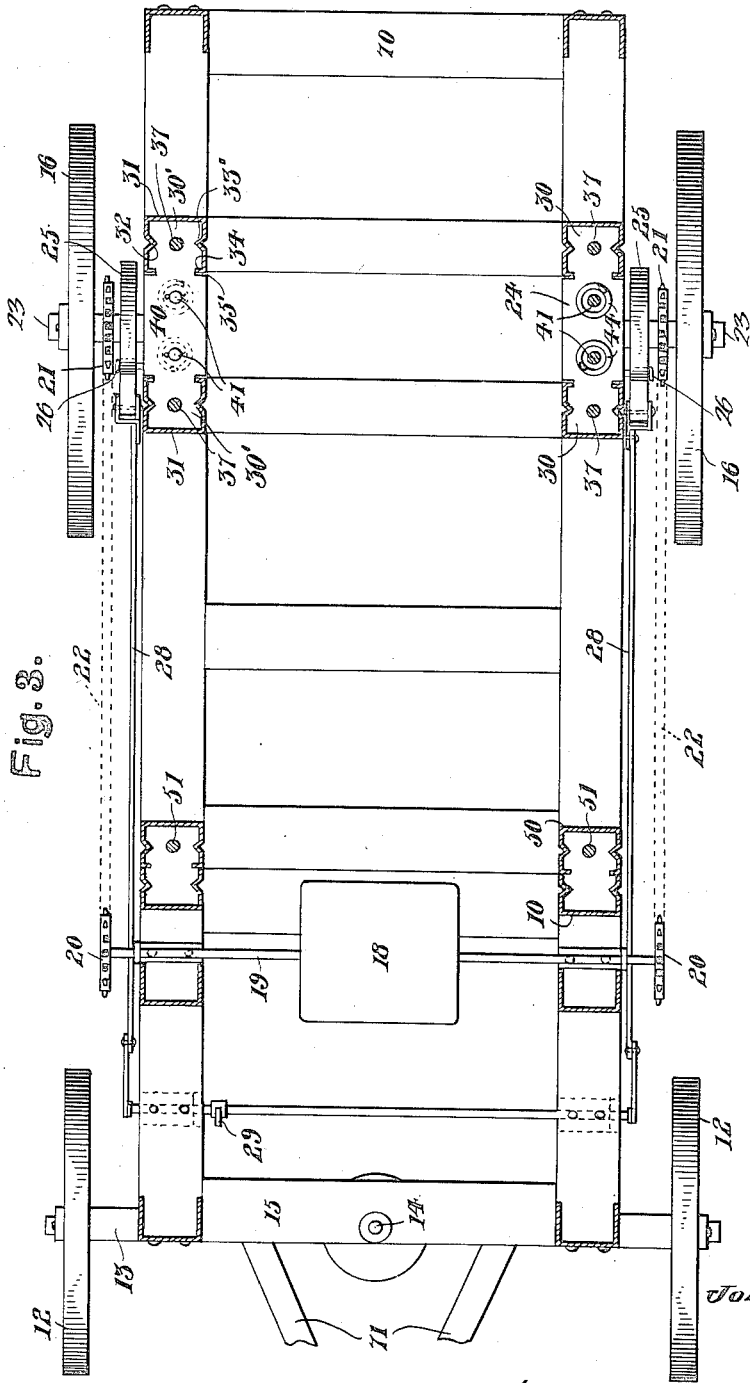

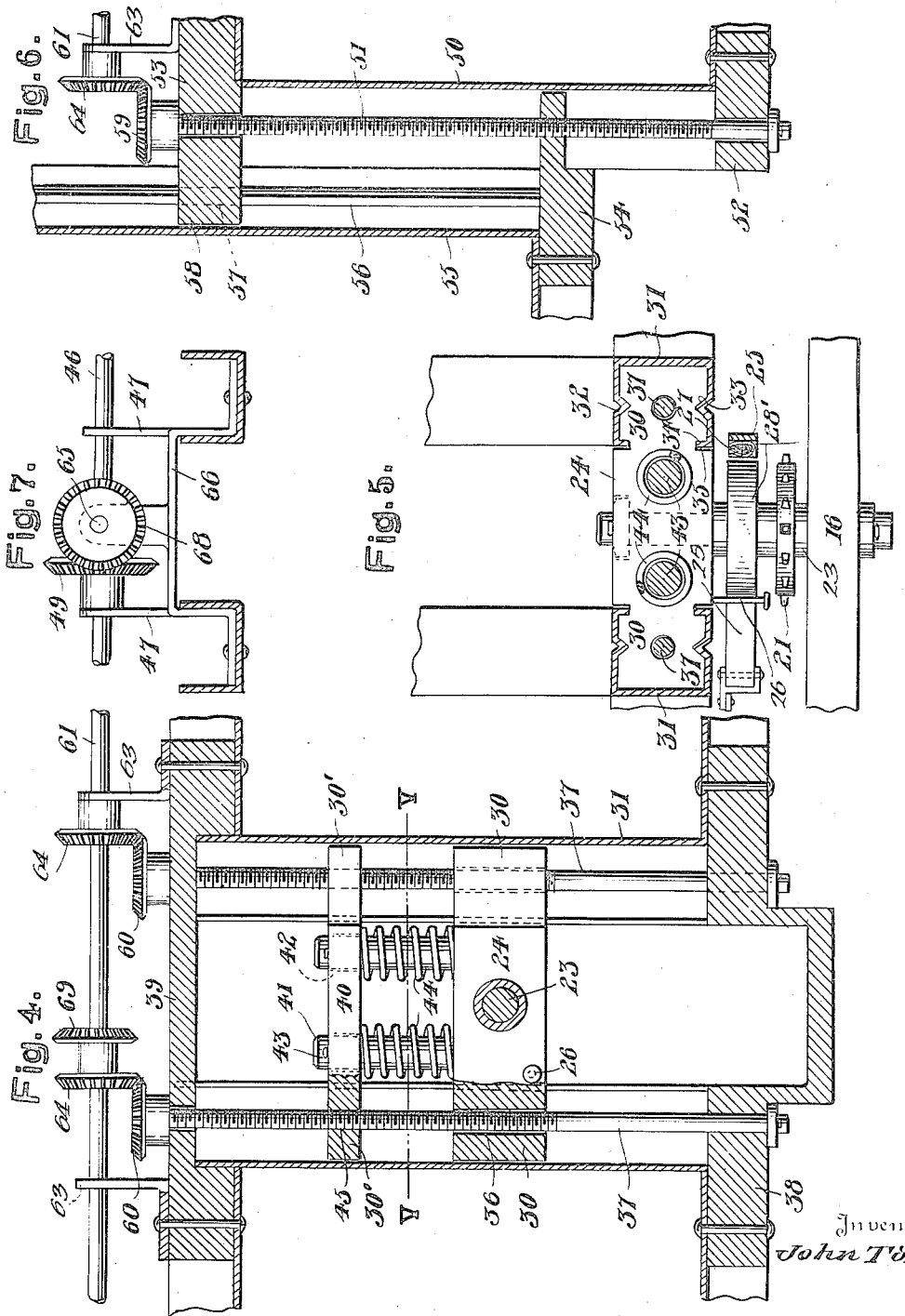

JOHN TÓTH, OF NEWARK, OHIO, ASSIGNOR OF ONE-THIRD TO PETER SZABO, OF NEWARK, OHIO.

MOVING-TRUCK.

1,188,860.   Specification of Letters Patent.   Patented June 27, 1916.

Application filed August 17, 1915.   Serial No. 45,928.

*To all whom it may concern:*

Be it known that I, JOHN TÓTH, a subject of the King of Hungary, residing at Newark, in the county of Licking and State of Ohio, have invented certain new and useful Improvements in Moving-Trucks, of which the following is a specification.

This invention relates to certain new and useful improvements in moving trucks.

The primary object of this invention is the provision of a truck adapted for transferring and hauling heavy articles such as automobiles, pianos and safes, the device being adapted for facilitating the reception of the load within the inclosure of the truck.

Another object of the device is the provision of a truck having a receiving body which is vertically adjustable for positioning the same for convenient access from different heights of platforms and whereby automobiles and other heavy bodies may be easily loaded upon the truck.

With these general objects in view and others that will appear as the nature of the invention is better understood, the same consists in the novel combination and arrangement of parts hereinafter more fully described, illustrated in the accompanying drawings, and pointed out in the appended claims.

In the drawings forming a part of this application and in which like-designating characters refer to corresponding parts throughout the several views: Figure 1 is a side elevation of the device. Fig. 2 is a top plan view thereof. Fig. 3 is a sectional view taken upon line III—III of Fig. 1. Fig. 4 is an enlarged vertical sectional view taken through the axle carried adjusting means. Fig. 5 is a cross-sectional view taken upon line V—V of Fig. 4. Fig. 6 is an enlarged sectional view taken upon line VI—VI of Fig. 2, and Fig. 7 is a sectional view taken upon line VII—VII of Fig. 2.

Referring more in detail to the drawings, the truck consists of a forward frame 10 adapted for receiving a motor and a rear frame or receiving cage 11 vertically adjustably mounted in the manner and for the purpose herein set forth, the front walls 12 of the truck being carried by a forward axle 13 pivoted by a bolt 14 to the lower sill 15 of the front frame 10, while the relatively larger rear wheels 16 of the truck are supportingly mounted beneath the rear cage 11 thereof.

The front frame 10 is higher than the rear cage 11 and is provided with angular seat brackets 17 for the driver of the truck. A motor 18 is positioned between the said brackets being provided with a power shaft 19 having oppositely positioned sprocket wheels 20 thereon and by means of which power is communicated to relatively larger sprockets 21 secured to the rear wheels 16 such communication being effected by means of opposite sprocket chains 22 running over the said sprocket wheels 20 and 21.

The rear wheels 16 are journaled upon stub axles 23 arranged in horizontal alinement with each other and fixedly secured to opposite blocks 24 carried by the opposite vertical seats of the rear cage 11. Opposite brake bands 25 are secured at one end as at 26 with the adjacent block 24 and are provided with friction facing strips 27 adapted to engage brake drums 28' secured to the said axle 23. The lower ends of the brake bands 25 are attached to links 28, the forward ends of said links being connected to an angular brake lever 29 whereby the brake bands 25 are readily applied and released.

The framework of the frame 10 and cage 11 is preferably formed of metallic U-beams as herein illustrated, and the axle blocks 24 have their opposite ends 30 received vertically slidable within parallel side beams 31 of the cage 11, the said side beams having opposite longitudinal V-shaped inwardly projecting ribs 32 having sliding reception within complementally formed longitudinal V-shaped grooves 33 in the said block ends 30. The beams 31 are provided with inturned flanges 34 having sliding reception within opposite side slots 35 of the blocks 24 as best illustrated in Fig. 3 of the drawings. The said block ends 30 have vertically arranged perforations 36 extending therethrough, parallel upright threaded shafts 37 freely extending through the said perforations, the shafts 37 having their lower ends journaled through base brackets 38 spanning the lower ends of the side beams 31, while the upper ends of the said shafts are journaled in a cross head 39 spanning the tops of the said beams.

A plate 40 is provided for each of the blocks 24 and is substantially of the same configuration although preferably of less thickness and being slidably mounted between the side beams 31 by having opposite grooves 33' for receiving the ribs 32 of the said beams, while the flanges 34 of the beams enter side slots 35' of the plates. Upright guide posts 41 are carried by the blocks 24 and are freely positioned through perforations 42 in the said plates and are prevented from removal by means of cotter pins 43 upon the upper ends of the said posts, while encircling springs 44 are carried by the said posts between the adjacent faces of the blocks 24 and plates 40. The removably mounted shafts 37 are screw-threaded through threaded perforations 45 of the plates 40. By this arrangement of elements, it will be seen that as the blocks 24 are mounted upon the stub-axles 23 of the rear wheels, the plates 40 will thus be resiliently supported upon the said blocks by means of the springs 44 so that the weight of the cage 11 will be directly carried by the shafts 37 which support the afore-mentioned plates 40.

A shaft 46 is journaled centrally of the top of the cage 11 and extends longitudinally thereof, the same being supported by brackets 47 and having an operating crank 48 at the rear of the cage, while a beveled gear 49 is secured to the said shaft 46. The forward upright corner beams 50 of the cage 11 are provided with threaded shafts 51 journaled longitudinally therethrough by means of base blocks 52 at the bottoms of the said beams 50 and by top blocks 53 at the tops thereof, the said shafts 51 being screw-threaded through similar blocks 54 carried at the bottoms of the rear upright posts 55 of the frame 10. Upright guide posts 56 are fixed within the frame beams 55 and upon these posts, the top blocks 53 are slidably mounted by means of perforations 57 through the said blocks, it being noted that the ends 58 of the said top blocks 53 are of similar configuration to the opposite ends 30 of the blocks 24 thereby conforming to the configuration of the beams 55 within which they are slidably mounted.

The upper ends of the forward shafts 51 of the cage 11 are provided with beveled gears 59 directly above the afore-mentioned top blocks 53, while similar gears 60 are secured to the upper ends of the shafts 37. Side shafts 61 are carried by the opposite top beams 62 of the cage 11, being journaled in spaced brackets 63 positioned thereon. The side shafts 61 are each provided with three beveled pinions 64 which are in constant mesh with the beveled gears 60 and 59 of the shafts 37 and 51 respectively. Lateral stub shafts 65 are journaled in top plates 66 of the cage 11 and are each provided with a gear 67 in constant mesh with the afore-mentioned gear 49 on the operating shaft 46.

A similar gear 68 is provided upon the outer end of each of the shafts 65 being in constant mesh with a gear 69 carried by the adjacent side shaft 61.

From this detailed description of the device, it will be seen that by turning the operating crank 48, the shaft 46 will be revolved for turning the lateral shafts 65 which thereby impart revolution to the side shafts 61. The said side shafts being revolved in either direction desired, the threaded shafts 37 and 51 will be operatively turned for shifting the cage 11 either vertically upwardly or downwardly. Thus, by turning the crank 48, the bottom or platform portion 70 of the cage may be accurately adjusted to the desired height for ready access from a platform or other support and whereby automobiles or other goods to be transported may be readily positioned within the said cage 11. Similarly, when desired to unload the goods from the cage, the cage bottom 70 may be adjusted to the desired height for easily removing the goods therefrom. It will be understood that instead of the motor 18, draft animals may be employed for propelling the truck, the same being attached to the forward frame members 71. By this arrangement any heavy articles may be readily located and transported by means of the present device. While the form thereof herein shown is the preferred embodiment thereof, it is nevertheless to be understood that minor changes may be made therein without departing from the spirit and scope of the invention as claimed.

What I claim as new is:—

1. A truck comprising a forward frame, having its rear corner beams U-shaped in cross-section, a receiving cage, connecting members carried by the said cage and vertically slidably mounted within the said beams, blocks projecting rearwardly of the said frame and provided with threaded perforations therethrough, screw - threaded shafts journaled in the said cage and threaded through the said perforations, and vertically slidable blocks carried by the cage, threaded vertical shafts freely extending through said blocks, plates having threaded engagement with the shafts and resiliently supporting the blocks, stub axles and wheels therefor carried by the blocks, and means for simultaneously operating the said shafts.

2. A truck comprising a forward frame, having its rear corner beams U-shaped in cross-section, a receiving cage, connecting members carried by the said cage and vertically slidably mounted within the said beams, blocks projecting rearwardly of the said frame and provided with threaded perforations therethrough, screw - threaded shafts journaled in the said cage and threaded through the said perforatons, opposite pairs of upright beams provided upon the said cage substantially U-shaped in cross-section, blocks having their opposite ends slidably mounted in the said beams, stub shafts secured to the said blocks, traction wheels journaled upon the said blocks, threaded shafts screw-threaded through the opposite ends of the said plates within the said opposite beams and journaled in the said cage, and means for simultaneously operating the said threaded shafts.

In testimony whereof I affix my signature in presence of two witnesses.

JOHN TÓTH.

Witnesses:
STEVEN FLOREIN,
E. T. JOHNSON.